US006970075B2

(12) United States Patent
Cherouny et al.

(10) Patent No.: US 6,970,075 B2
(45) Date of Patent: Nov. 29, 2005

(54) ELECTRONIC PROGRAMMABLE SPEED LIMITER

(76) Inventors: Peter Herbert Cherouny, 43 Pheasant Way, South Burlington, VT (US) 05403; Jerry Mark Roane, 101 S. Laurelwood Dr., Austin, TX (US) 78733

(*) Notice: Subject to any disclaimer, the term of this patent is extended or adjusted under 35 U.S.C. 154(b) by 872 days.

(21) Appl. No.: 09/695,443

(22) Filed: Jun. 19, 2001

(65) Prior Publication Data

US 2004/0212506 A1    Oct. 28, 2004

(51) Int. Cl.[7] ............................................... B60Q 1/00
(52) U.S. Cl. ...................... 340/439; 340/438; 701/36; 701/93
(58) Field of Search ................ 340/439, 438, 340/441, 573.1, 576; 701/36, 70, 93, 99

(56) References Cited

U.S. PATENT DOCUMENTS

| | | |
|---|---|---|
| 4,098,242 A | 7/1978 | Anderson .................... 123/102 |
| 4,341,985 A | 7/1982 | Houskamp ................... 318/260 |
| 4,467,428 A | 8/1984 | Caldwell ..................... 364/426 |
| 4,495,913 A | 1/1985 | Gray ........................... 123/352 |
| 4,510,899 A | 4/1985 | Macy ...................... 123/198 D |
| 4,559,912 A | 12/1985 | Larom et al. ................ 123/350 |
| RE32,955 E | 6/1989 | Macy ...................... 123/198 D |
| 5,096,015 A | 3/1992 | Akishino et al. ............ 180/179 |
| 5,172,785 A * | 12/1992 | Takahashi .................... 180/271 |
| 5,319,352 A | 6/1994 | Robertson et al. ........... 340/466 |
| 5,549,089 A | 8/1996 | Snell et al. .................. 123/352 |
| 5,819,198 A * | 10/1998 | Peretz ......................... 701/117 |
| 6,198,996 B1 * | 3/2001 | Berstis ......................... 701/36 |
| 6,253,143 B1 * | 6/2001 | Silvernagle et al. .......... 701/93 |
| 6,306,063 B1 * | 10/2001 | Horgan et al. ............... 477/108 |
| 6,629,034 B1 * | 9/2003 | Kozak et al. ............... 701/200 |
| 6,807,481 B1 * | 10/2004 | Gastelum .................... 701/209 |

* cited by examiner

*Primary Examiner*—Toan N. Pham
(74) *Attorney, Agent, or Firm*—James W. Hiney

(57) ABSTRACT

The instant invention utilizes a programmable circuit which has a 186EM Micro controller therein to operate a circuit which integrates peripherals such as a memory controller, a programmable input and output, a timer and serial controller to increase system functionality and lower cost. The entire CPU circuit is mounted in a vehicle near the steering wheel where the key fob of the particular driver can be inserted for driver identification. There is an electronic box mounted forward of the firewall that contains the module specific for the brand of vehicle. The CPU module is wired to the under the hood box and a connection to that wiring in the back of the dash mounting holder. The holder guides the CPU module into the connector as the CPU module is inserted into the holder. The programmable unit is contained in a module which controls the speed of the vehicle and the memory function of the module itself. The unit is essentially a hand-held computer that is an integrated, low-voltage, single chip implementation of a high-performance 16 bit, x86 compatible microprocessor with the extra logic needed for PC/AT-compatible PCs. It has an AM 386 CPU core with a memory control unit, ISA bus controller and peripheral control logic.

32 Claims, 20 Drawing Sheets

FIG. 2

Judicial Driver Information

Driver's Name: John Doe

Sex: ⊙ Male ○ Female

License Number: 10986917

State of Issuance: SD, TN, TT, TX

Is the Driver subject to impulsive actions? ○ Yes ⊙ No

[OK] [Cancel] [Help]

FIG. 3

Judicial Driver Information

Driver's Name: John Doe

Judicial Driver Information

Moving Violations
- ○ 1  ○ 3  ○ 5  ○ 7  ○ 9
- ◉ 2  ○ 4  ○ 6  ○ 8  ○ Too Many

OK
Cancel
Help

Is the driver subject to inplusive actions?   ○ Yes   ◉ No

Start | PrtScr 2.0d <untitled> | Dr. Peter Cherouny's Pro... | 2:33 PM

FIG. 4

Judicial Driver Information

Driver's Name: John Doe

Alcohol Violations

How many Alcohol Related Violations has the Driver had in the past five years?

○ 1   ○ 2   ○ 3   ○ More than 3

OK
Cancel
Help

Is the driver subject to inplusive actions?   ○ Yes   ⊙ No

OK

Start | PrtScr 2.0d <untitled> | Dr. Peter Cherouny's Pro... | 2:33 PM

Parental Driver Information

Driver Status
- ○ Recent Driver  ○ Young Driver
- ○ Speeding as a Habit  ○ Earned Trust Responsibility Level
Your Son is Responsible
- ○ 100% of the time  ○ 50% of the time
- ● 80% of the time  ○ 30% of the time Between 1:00 am and 3:30 am what speed will the vehicle be allow to go?
- ○ 30 miles per hour  ○ Full Speed
- ○ 50 miles per hour  ● Zero

[OK] [Cancel] [Help]

FIG. 11

Commercial Driver Information

Driver's Number: 123456

Driver's Name: John doe

Age: 21

Sex: ● Male  ○ Female

License Number: 10986917

State of Issuance: SD / TN / TT / TX

Driver Category
- ○ Full Time Professional Driver Type 1
- ○ Full Time Professional Driver Type 2
- ○ Full Time Professional Driver Type 3
- ○ Maintenance Driver
- ○ Temporary Driver
- ○ Part Time Driver
- ○ Unrecognized Driver
- ○ Owner
- ● No Driving History

[OK] [Cancel] [Help]

Start | PrtScr 2.0d <untitled> | Dr. Peter Cherouny's Pro... | 4:08 PM

FIG. 12

Commercial Driver Information

Driver's Number  123456

OK

Commercial Driver Information

Has Alcohol Ever been a problem ?
○ Yes  ⦿ No

What is the Speed Limit of the Vehicle between 1:00 am and 3:30 am ?
○ 30 miles per hour  ○ Full Speed
○ 50 miles per hour  ⦿ Zero OK
Cancel
Help ○ Full Time Professional Driver Type 3  ○ Part Time Driver  ⦿ No Driving History Start | PrtScr 2.0d <untitled> | Dr. Peter Cherouny's Pro... | 4:08 PM

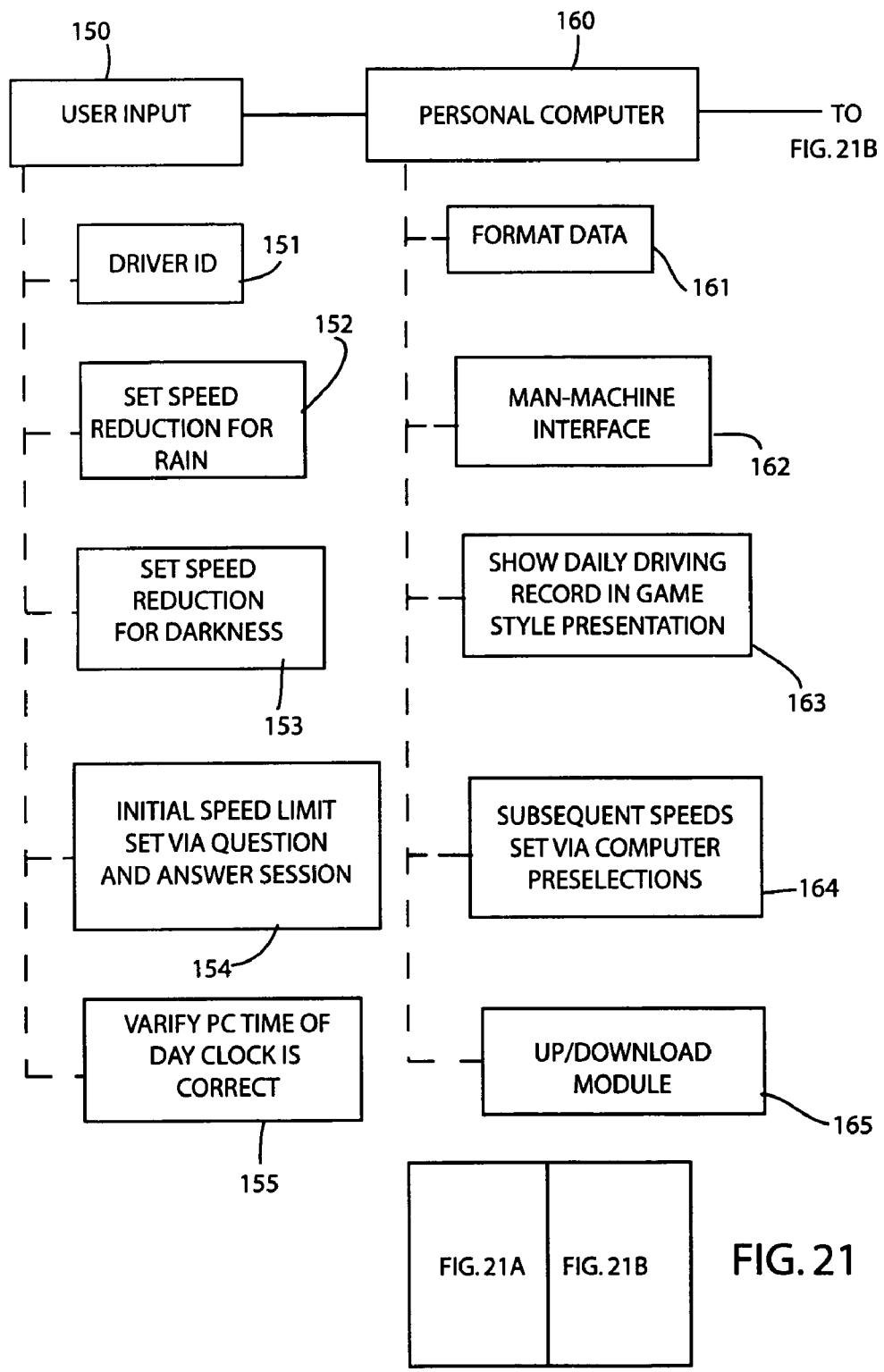

ELECTRONIC PROGRAMMABLE SPEED LIMITER

BACKGROUND

A major problem on the highways of the United States and other developed countries is the amount of vehicular traffic on the road. Not only are there an ever increasing amount of vehicles but the excessive speed at which they are traveling is increasing due to political reasons, the raising of speed limits, commercial reasons, the commercial sector advocates higher speeds for interstate trucking and the very technological advances in the vehicles, both private and commercial, themselves.

The excessive speed of vehicles is the main contributor to accidents in general as well as injury and death associated with accidents when they occur. Therefore, to reduce highway accidents and deaths, this excessive speed of vehicles must be lessened. Reducing the excessive speed of vehicles, studies show, decreases the frequency and severity of accidents. There is a population segment which is at risk of accidents likely due to excessive speed. It is the purpose of this invention to limit the speed of vehicles of the at risk driver which will decrease accident frequency and severity.

Driving faster than road conditions allow is involved in a large percentage of automobile and truck accidents. In addition, when an accident occurs the risk of injury and death increase as speed increases. Novice drivers are especially at increased risk due to their undeveloped driving skills and their limited ability to judge risk. The novice group has been identified as significantly at risk and this is reflected in insurance premiums. The instant invention, a programmable speed governor, allows the vehicle owner to prospectively program a limit to the speed of the car in which it is installed. Additionally, the memory capability of the device allows for a review of compliance with the speed limiting governor for various purposes, insurance, liability, legal and others.

There is substantial documentation associating increased speed with an increase in the risk of collision with another vehicle or object. These higher speeds also contribute substantially to a higher risk of injury and death. In a 1995 study, Cooper et al found excessive speed to be the violation most commonly involved in accidents resulting in injuries or fatalities. In the study of novice drivers, forty-one percent (41%) of those having had an accident claim had recent prior convictions for driving violations. Additionally, excessive speed was involved with sixty-nine percent (69%) of these violations with an additional seventeen percent (17%) including citations for failure to obey traffic controls (or running red lights and stop signs) which is often associated with speeding. In those accidents which produced casualties, forty-two percent (42%) of drivers had recent prior convictions for driving violations, the vast majority of which was for speeding. Cooper et al concluded that prior convictions, mostly for speeding, is a very good predictor and early warning system for novice drivers whom are likely to be involved in automobile accidents. These statistics can be used to develop intervention strategies to decrease the likelihood of auto accidents resulting in injury or death. The data strongly suggests that the prevention of speeding will lead to an immediate decrease in the accident rate as well as the cost to property. An additional finding of the study by Cooper et al was that novice drivers involved in accidents where they (as opposed to another party) were found to be at fault were likely to be driving either (i) for pleasure or (ii) to and from work in a car for which they were neither the principal operator of the car nor the owner of the car. This suggests that in most accident cases involving a novice driver, they are most likely driving their parent's car to get to or from a job or were just "cruising". The parent, whose car is being driven, then has a vested interest in having an ability to prevent violations which result in an increase in accident risk.

The higher incident of accidents among young drivers has been attributed to risk-taking attitudes manifested as reckless driving, particularly speeding and tailgating. The urge for risk taking and sensation-seeking peaks during late adolescence and coupled with a lack of driving experience, which prevents novice drivers from accurately calculating or perceiving the risks involved with their driving style, is clearly a deadly combination. A study in 1993 in Los Angeles found that drivers eighteen to thirty were more likely to report speeding often or most of the time than drivers in other and older age groups. Specifically, drivers aged eighteen to thirty report speeding "often" (60% of the time) with thirty-one percent (31%) reporting running a red light in the past month which violation often accompanies speeding. The study went on to report that drivers admitting they drove after drinking alcohol were significantly more likely to speed and run red lights. The inability of youth to appreciate the horrors of risk-taking in a vehicle, often accentuated by alcohol, likely contributes to these attitudes. Alcohol is either a "cause" of accidents by preventing the driver from assessing the situation correctly or a "contributor" to the risk taking associated with younger drivers especially. If one can limit the speed of the vehicle, then a clearer understanding of what contributes to or causes an accident can be attained.

Who then can be said to be a potential user or market for the programmable speed limiter? Certainly the parent or principal vehicle owner can be said to have a vested interest in decreasing the risk of his or her son or daughter having an accident with their vehicle. Decreasing the speed of a vehicle one's child is driving effectively reduces the chance of injury or death of said child. In addition, the ability of the parent to use the instant invention to monitor driving performance is a prerequisite to lower insurance premiums resulting from fewer violations and/or accidents.

Another user of the instant invention are owners of vehicles who have a high violation record index and are said to be "at risk" drivers. Courts can impose the restriction of having a speed governor on one's car if one has a bad driving record yet needs to keep driving to keep a job or the like. The judiciary currently imposes restrictions on these drivers such as breath analyzers, which can stop the vehicles motor for drunk driving convictions. The National Highway Traffic Safety Administration has considered provisional driver licensing guidelines among its efforts to reduce the public safety hazard of the risk-taking and novice driver. As the restriction imposed by the instant invention is on the car, not the driver, it would be easier to enforce. The authorities could insert the coded limiting speed and the driver could not alter it.

Yet another market exists for the instant invention among companies who hire drivers for commercial purposes. This ranges from couriers to interstate trailer trucks and limiting the speed of commercial vehicles would bring a welcome sigh of relief to the segment of the population that must travel on the interstates. Incredibly, motor vehicle injuries account for one third (33%) of the work related deaths and bringing the number down would directly affect worker safety. The present check on interstate rigs is for viewers of infractions to call 800 numbers, which usually only results in about 10% of the infractions being reported. In addition, the driver always can argue that the complainant was wrong and there is no factual evidence to refute it. With the instant invention, the addition of a memory capability to the speed governor allows for a permanent record of the truckers omissions or violations. It would most certainly point out individual driving habits which should afford the fleet owner significant insurance savings if compliance is documented and an associated accident rate decrease is noted.

BACKGROUND ART

There have been attempts to regulate the speed of motor vehicles in the past but none haveee been successful. There have been attempts to sense the speed of a vehicle with a pulse width digital signal train that is fed into an analog linear circuit and a DC voltage proportional to the speed is produced. This common practice of pulse width integration to obtain a voltage proportional to speed has been around for many, many years. The method lends itself to operational amplifiers and analog computing. The instant device counts clock cycles between rising edges as well as any other part, such as falling edges or even voltage levels, of the square wave coming from the antilock sensors on one of the wheels. This digital computer version of speed detection is unique when used with the other features of this device. It is contemplated to put a sensor like the ABS sensor on the same cog but around the axle axis a few degrees.

Other devices use a reference speed which is input to a keyboard device or via thumbwheels. Devices like this use a very expensive computer with sophisticated man/machine interface. The use of a remote controller to do the man/machine interface in this application is unique because it allows for a smaller and less costly mobile unit. There are two parts to the software, the first part allows for setting all the parameters for operation. U.S. Pat. No. 3,878,915 does not mention detecting for rain and darkness as controlling factors.

One of the problems with the earlier devices is that they didn't have the computing power now available and did not foresee the need for such. The older components used did not have the sophistication of an x86 processor.

In U.S. Pat. No. 3,878,915 a speed-limiting device is disclosed. The device senses the speed of a vehicle with a pulse width digital train that is fed into an analog linear circuit and a DC voltage proportional to the speed is produced. It was common practice of pulse width integration to obtain a voltage proportional to speed and this idea is well known. The method lends itself to operational amplifiers and analog computing. The instant device counts clock cycles between square waves coming from an antilock type sensor on one of the wheels or from another digital speed sense location on the drive chain, i.e., it is a digital detection of speed. The instant device determines the maximum speeds profile by the use of the driver's number encoded through the key fob. With the prior art, the code entry only happens at one point, namely the beginning of the trip. It does not allow for shutting down the vehicle only after exhaustive attempts have been made to get the driver to slow the vehicle. In addition, in the prior patent the code entry into the device only happens at the start of the trip as opposed to the instant invention where it intervenes at any point along the journey where excessive speed is present. Each of the drivers allowed to drive that vehicle have a table of speeds and times and conditional codes that determine the maximum speed given a set of real world conditions. The table also contains values that configure the severity and quickness of the computer to shut down the engine. The instant invention has a remote keypad which is really the keypad of the PC. The term "predetermined timing schedule" in the prior art patent is vague and unclear. The instant invention targets several time blocks for maximum speed reduction and for vehicle operation. The use of thumbwheels on the prior art device does not function as well as the means used in the instant invention. The prior art device also requires recycling of the code whereas in the instant invention the code is selectable over a wide range. Unlike the prior art device, the invention does not produce a speed signal but rather loads a register with a count from the speed sensor that is integral with the antilock brake device. This is a square wave with multiple toggles per wheel turn. The correction for vehicle speed versus calibrated miles per hour is a number loaded via the infrared "IR" link. As alternative to an infrared link, the instant device can use a radio link in addition to the infrared capability or RS 232.

The instant device allows for the authority figure to be a player in the process unlike the prior art. This is accomplished by the delayed download of the limiting information to dictate the operation of the vehicle. This download is contingent on the driver successfully operating the vehicle reasonably under varying conditions. The idea of how many and how long these excursions out of the pre-selected boundaries are allowed will vary from driver to driver and are inputted via the home PC software. The prior art device has no ability to make such a decision nor does it have a record of the driver over time. The only way it could function is to allow the driver to drive in a "passing" mode every few seconds which is unrealistic.

The reference speed is inputted to a keyboard device. While this may appear to be similar to the instant invention it is not as the instant invention uses a keyboard entry on a more expensive and complicated computer with a more complex man/machine interface. The use of a remote computer to do the man/machine interface is novel because it takes the cost and size burden off the mobile unit. As the unit has no keyboard and visual screen it is much less complicated to build and thus has more utility per dollar. The more expensive computer can be shared with other functions and the cost amortized. It uses all the 3D graphics and audio functions as the home PC to more effectively communicate with the user of the device.

BRIEF DESCRIPTION OF THE INVENTION

The instant invention utilizes a programmable circuit which has a 186EM Micro controller therein to operate a circuit which integrates peripherals such as a memory controller, a programmable input and output, a timer and serial controller to increase system functionality and lower cost. The entire CPU circuit is mounted in a vehicle near the steering wheel where the key fob of the particular driver can be inserted for driver identification. There is an electronic box mounted forward of the firewall that contains the module specific for the brand of vehicle. The CPU module is wired to the under the hood box and a connection to that wiring in the back of the dash mounting holder. The holder guides the CPU module into the connector as the CPU module is inserted into the holder. The programmable unit is contained in a module which controls the speed of the vehicle and the memory function of the module itself The unit is essentially a hand-held computer that is an integrated, low-voltage, single chip implementation of a high-performance 16 bit, x86 compatible microprocessor with the extra logic needed for PC/AT-compatible PCs. It has an AM 386 CPU core with a memory control unit, ISA bus controller and peripheral control logic.

The software has two parts. The first allows for setting all the parameters for operation. These parameters allow for multiple drivers in multiple scenarios. The detection of rain and darkness and tampering and are inputted to allow them to affect the operation of the vehicle at different times. The driver does not have to remember codes as that function is now performed by the key fob function which identifies to the mobile computer who was or is about to operate the vehicle. This semi-automatic identification of who was driving eliminated two main problems with codes the first of which was forgetting the code. The second problem eliminated the need for an addition of a keypad and associated electronic hardware requiring a circuit debounce. The key fob allows the device to be mounted in an inconspicuous place and it can be inserted by feel alone. The owner of the software to program the mobile unit has the password right to enter the code.

Maximum speeds are determined by the codes entered. The instant device does not totally disable the vehicle, that could produce a dangerous situation, but rather allows a "reduced power" mode of operation to take over. The car will drive in the valet mode but not at a speed that would endanger anyone. The instant device will shut down the car only after exhaustive attempts by the electronic module to get the driver to slow the car down to the prescribed driving speed profile. The present device intervenes during a journey where bad driving is present. It does not kill the engine as most cars today have power steering and power brakes, which, if rendered inoperative, would require the driver to use more strength to bring the vehicle to the highway shoulder safely. The instant device also changes the speed profile at certain multiple times of the day such as at closing time of clubs during the weekend or at times when the driver is not given the privilege to drive.

The instant device utilizes input selector codes. The data is not coded going through the infrared link. It is literal data describing the numerous profiles of all the drivers under all the different driving conditions. The profile is set up in the instant device and inaccessible to the driver. It does not produce a speed signal rather a register is loaded with a count per pulse from the speed sensor that is integral with the antilock brake device. This is a square wave with multiple toggles per wheel turn. The correction for vehicle speed versus calibrated miles per hour is a number loaded via the infra red or radio link. The device compares speed to a dynamic speed limit which is unique.

The instant device does not cut off the ignition but has a slow down sequence which has several levels of sophistication. The first level sounds a short burst or chirp but does not record the infraction. The second level of this is that the excess speed of the driver is recorded and reported to an authority figure. That figure is the driving force behind altering the activity of the driver. There is also an information transfer to a central permanent record via the internet. This allows the authority figure to provide back up to his or her decision making on the drivers performance. Another incentive provided the driver is the provision of an annoying sound or noise when the speed desired is exceeded for a pre-programmed time. The sound level of this annoyance is loud or in the range of 65 db so that a real incentive is produced to stop speeding. A quick beep is followed by a buzzing or alarm which goes from intermittent to continuous through the remaining steps to slow the driver down. The next escalation is to turn off half of the fuel injectors to the engine which will automatically slow the vehicle down while maintaining sufficient power to maneuver and drive the vehicle at lower speeds.

The next step involves shutting off the remaining fuel injectors with a prescribed on/off cycle which allows the vehicle to be pulled over to the side of the road and burn the hydrocarbons still in the engine. This step is a last resort after all the prior steps have been employed. The ignition will be turned off. This renders a completely intoxicated driver harmless and the vehicle inoperable. The power of the stored data is the power of the instant device. The information recorded by the device allows the authority figure to alter future behavior.

The use of full power digital computer negates the need for a reference signal as found in the prior art devices. The information of speed and desired speed is contained in ASCII form and is not subject to all the problems that were associated with old analog computers such as drift, stray capacitance, signal degradation due to thermal shifts of the operational amplifier and electrical cross-talk 60 cycle noise from the local environment.

In the prior art devices, there was no way to make a record to guide decisions about future programming. It allows for a driver to pass under a controlled number of occurrences but at some point that ability will be curtailed. If the driver has a bad record the ability to "pass" will be denied. In addition, it would easy to by-pass the prior art system by hot wiring around it. In the instant invention, the wiring harness has decoy wiring that forms a loop through all the various electronic modules. If the looped wire that threads through all of the modules is broken for even a moment the event is recorded and documented.

While the instant device does accept a pulse train as the input, the approach of how it deduces the speed of the vehicle is much different. The instant system does not depend on the pulse width only in the time interval between rising edges of the square wave. This method is superior in that the frequency of the wave can increase beyond that of the earliest prior art. In earlier prior art devices, an analog computer is present which integrates the square wave and produces a voltage proportional to it.

OBJECTS OF THE INVENTION

Accordingly, it is an object of this invention to provide an electronic programmable speed limiting device for motor vehicles, and It is another object of this invention to provide a programmable electronic device for motor vehicles which also records the driving speed over a given period of time, and It is yet another object of this invention to provide a means by which a parent can govern the speed of his or her car when it is being used by an offspring, and A further object of this invention it to provide a safety device for the "at risk" segment of the driving public by limiting the speed of the motor vehicle they are driving by programming in a speed limit, A still further object of this invention is to use a remote computer to do the man/machine interface on a programmable electronic speed limiter for motor vehicles, These and other objects of the invention will become apparent when reference is had to the accompanying drawings in which;

FIG. 1 is a screen showing the main control of the program with the emphasis on judicial information, FIG. 2 is the screen of FIG. 1 now displaying judicial driver information such as license number, FIG. 3 is a screen displaying judicial driver information such as moving violations, FIG. 4 is a screen displaying judicial driver information such as alcohol related violations, FIG. 5 is a screen displaying the "save driver information" key, FIG. 6 is a screen displaying the screen of FIG. 1 with the emphasis on Parental information, FIG. 7 is a screen displaying parental information and license information, FIG. 8 is a screen displaying parental information as to preprogrammed status of driver and vehicle, FIG. 9 is a screen displaying saving parental information, FIG. 10 is the screen of FIG. 1 and emphasizing commercial information, FIG. 11 is a screen displaying commercial driver information, FIG. 12 is a screen displaying commercial driver record information, FIG. 13 is a screen displaying saving the commercial driver information, FIG. 14 is a front view of the module for containing the mobile unit of this invention, FIG. 15 is a side view of the module of FIG. 14, FIG. 16 is a top view of the module of FIG. 15, FIG. 17 is front view of the module similar to FIG. 14 but showing the location of the wiring, alarm and infrared communication component.

DETAILED DESCRIPTION OF THE DRAWINGS

FIGS. 1–13 show the operating program on a PC used by the operator of this system to preprogram the operating scenario for various drivers and conditions. The system shows four data bases, namely Judicial Information, Parental Information, Commercial Information and Statistical Information.

FIG. 2 shows the screen for input of Judicial driver Information. As shown, the information can take the form of name, age, gender, operator's permit number and state of issuance FIG. 3 shows a continuing screen for other information such as the number of moving violations the driver has received within the last five year.

Figure 1:
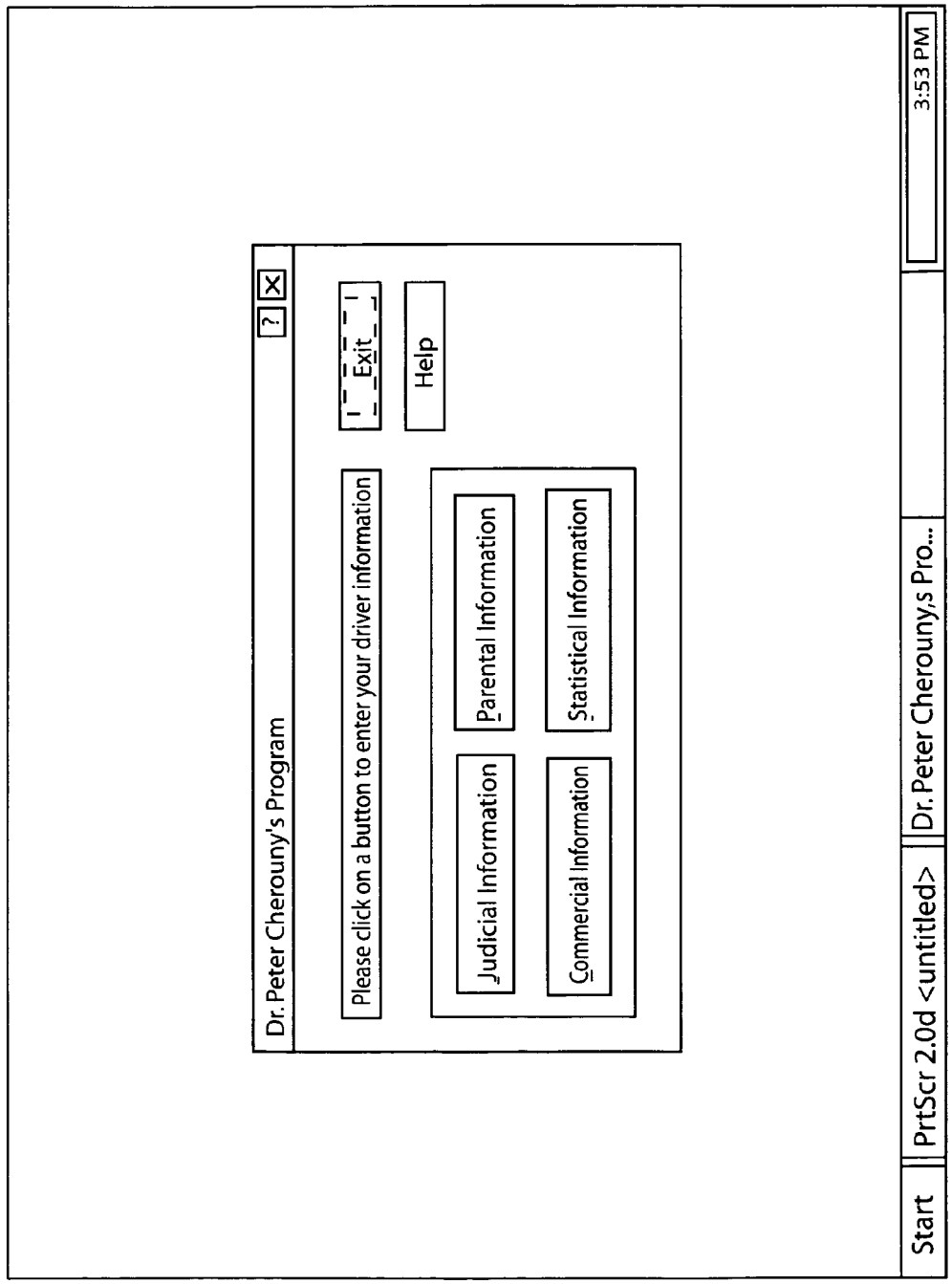
Figure 5:
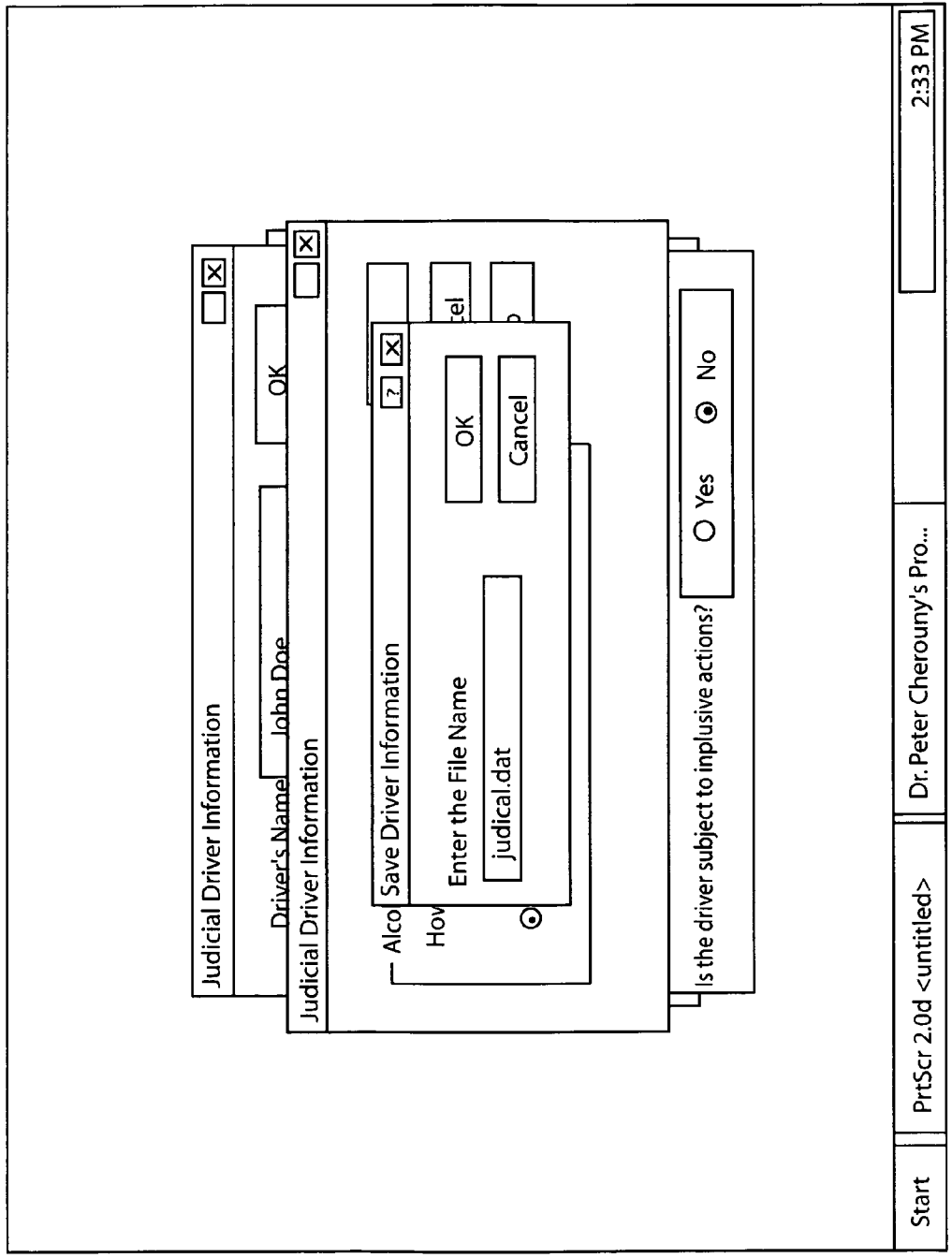

FIG. 4 shows a continuing screen showing the number of alcohol related violations the driver has received within the last five years and FIG. 5 is a SAVE function screen for saving the inputted information of FIGS. 2–4.

Figure 6:
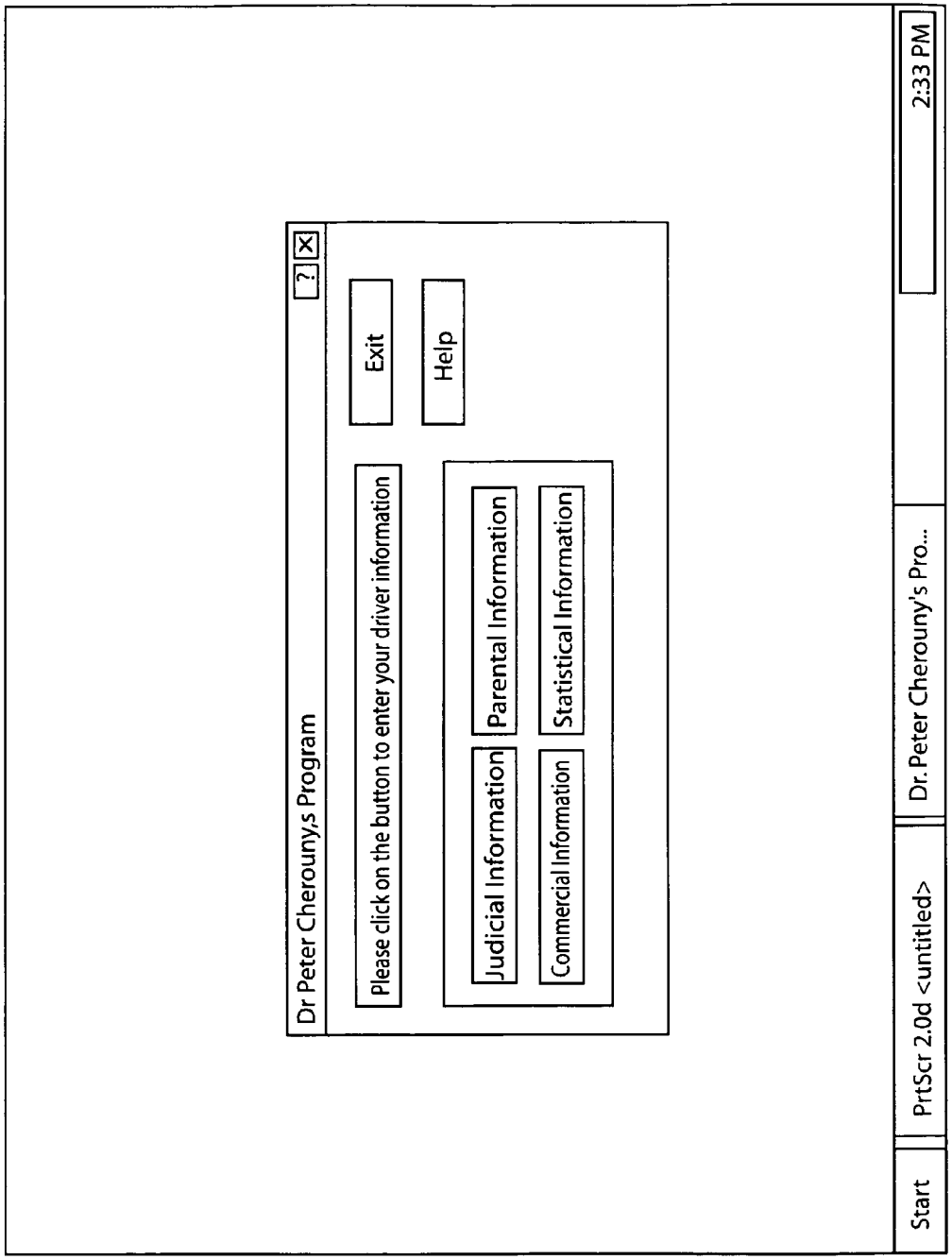
Figure 7:
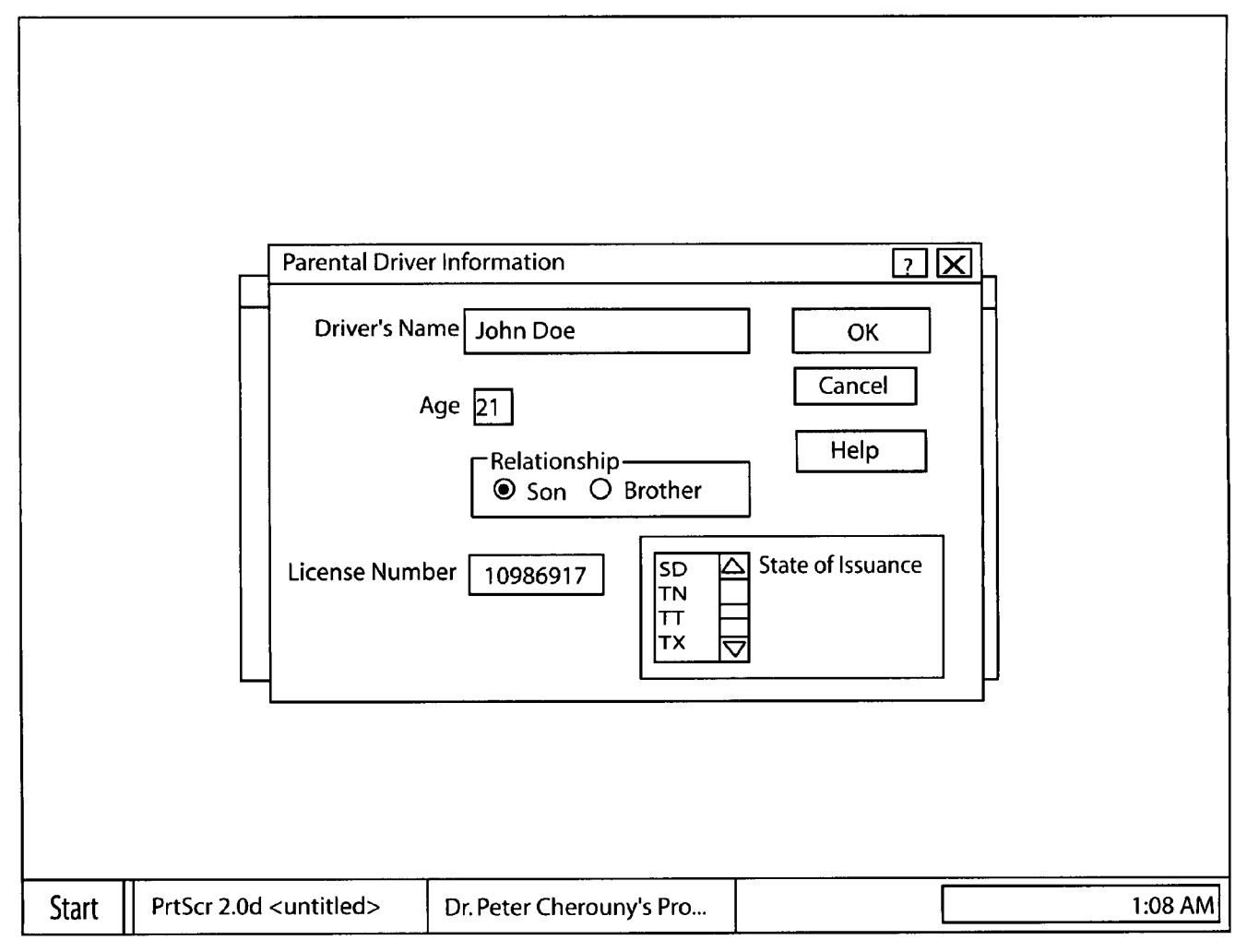
Figure 9:
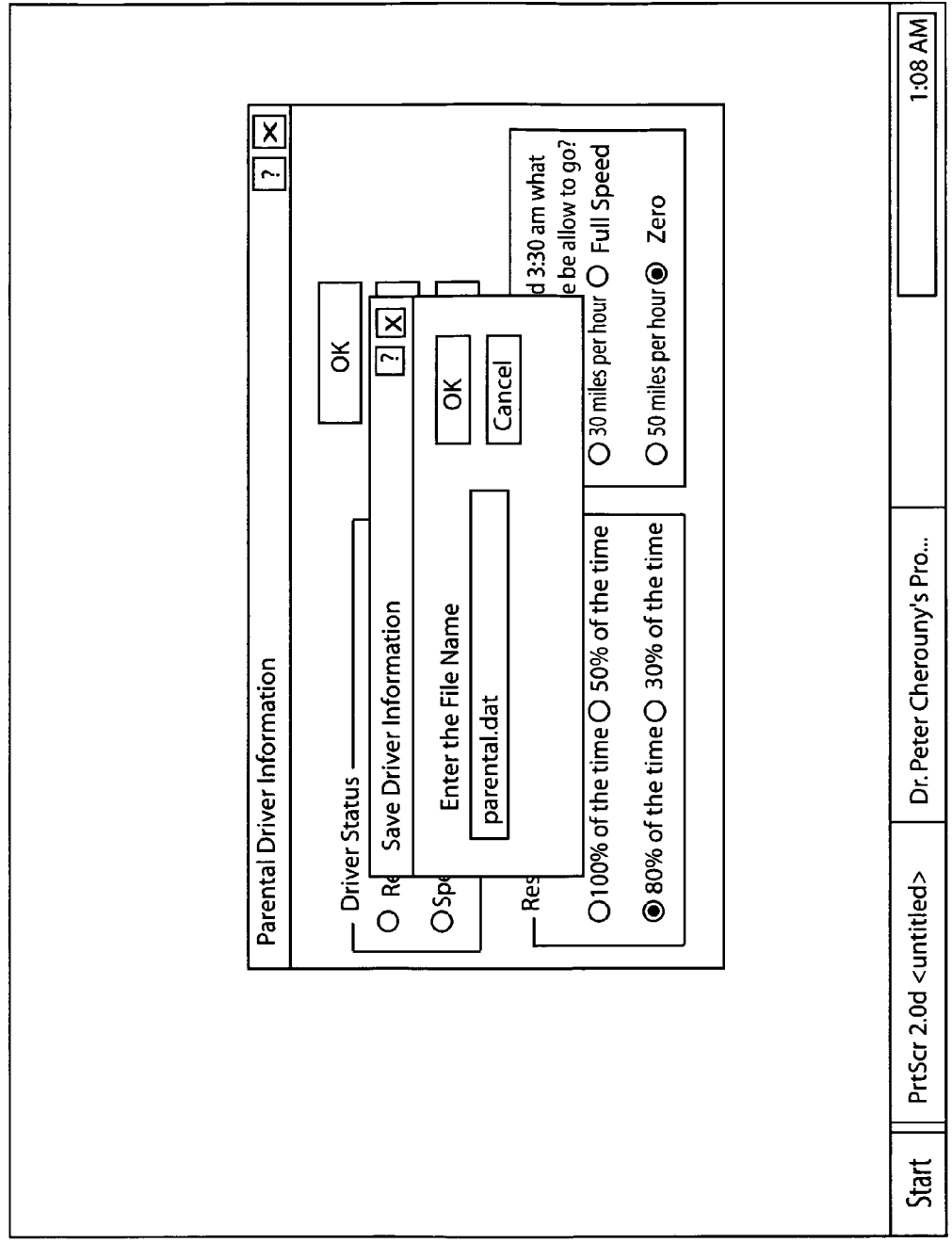

FIG. 6 shows the screen of FIG. 1 again with the emphasis on "Parental Information" this time. FIG. 7 shows the relationship of the driver to the parent as father and son and FIG. 8 shows an input for the parent to make to help the system arrive at a pre-programmed operation for the son. Note that a lot of "fine tuning" is available such as speed limiters for certain late hours and accommodation for certain demonstrated responsibility levels. FIG. 9 shows the SAVE function screen for the data entered under Parental Information.

Figure 10:
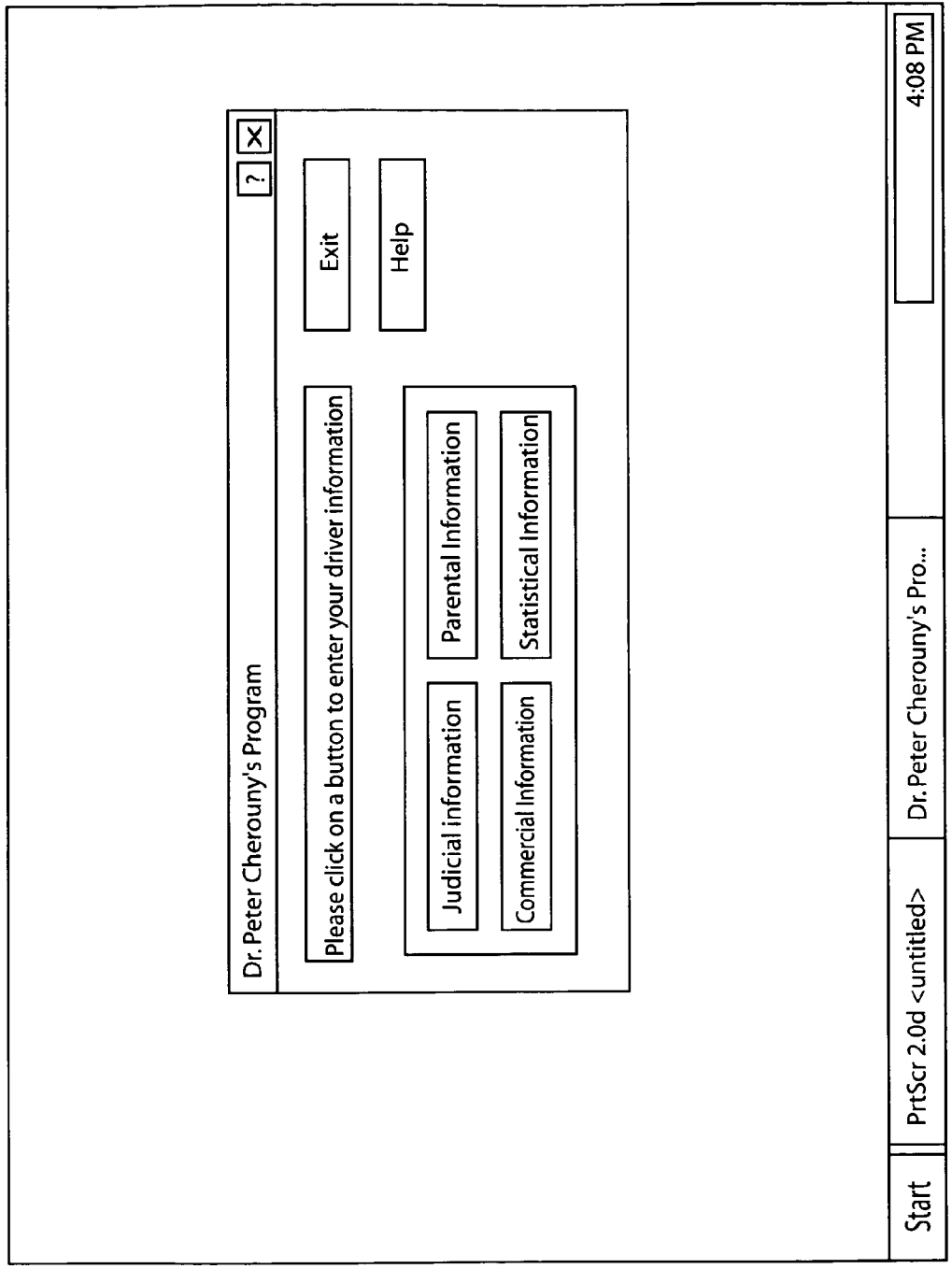

FIG. 10 shows the screen of FIG. 1 again with the emphasis on Commercial Information. Like in the situation with a Judicial driver information, FIG. 11 shows the input for a commercial driver including status and driving history. It also notes whether the driver is full time or part time.

Figure 13:
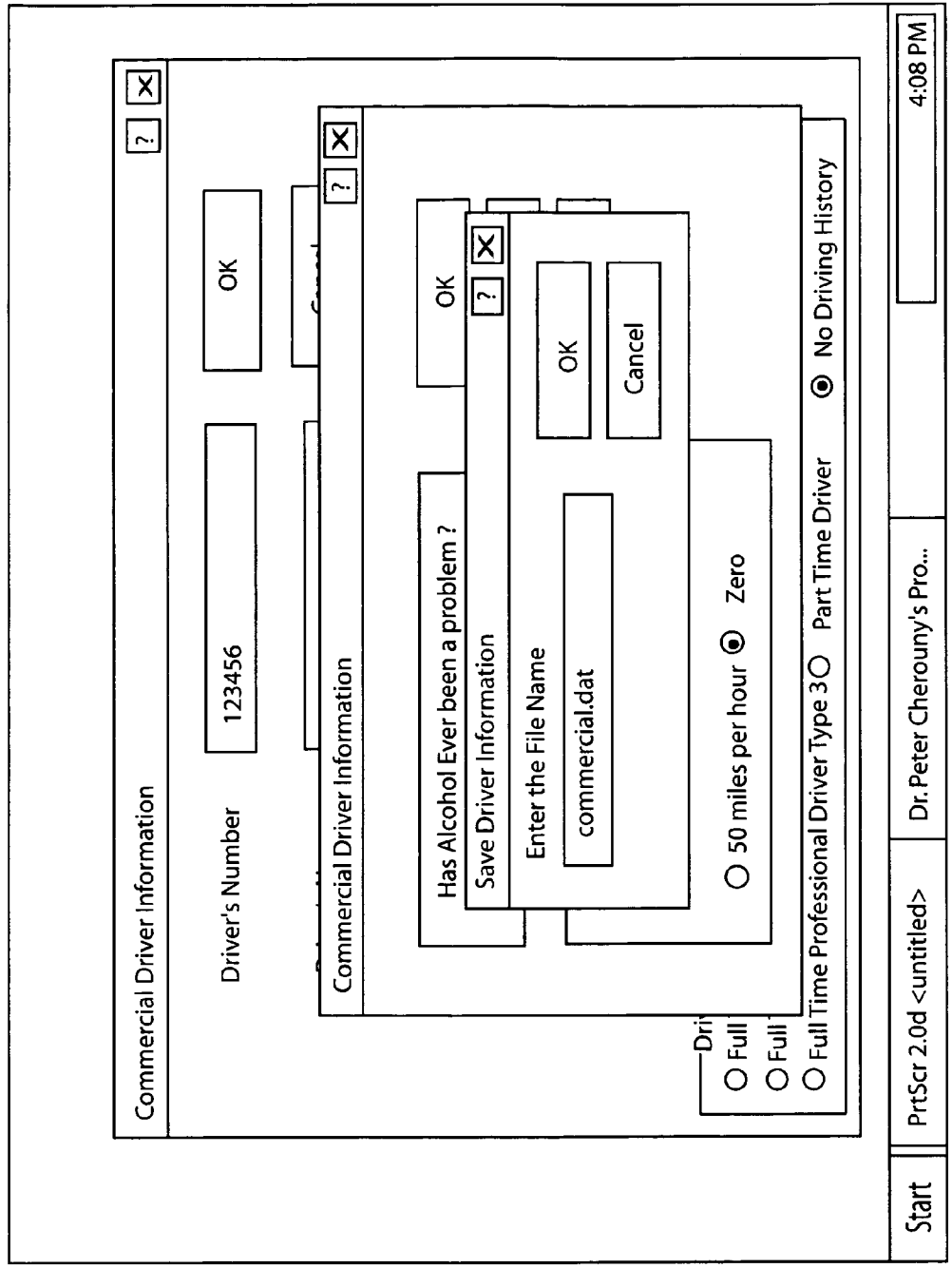
Figure 16:
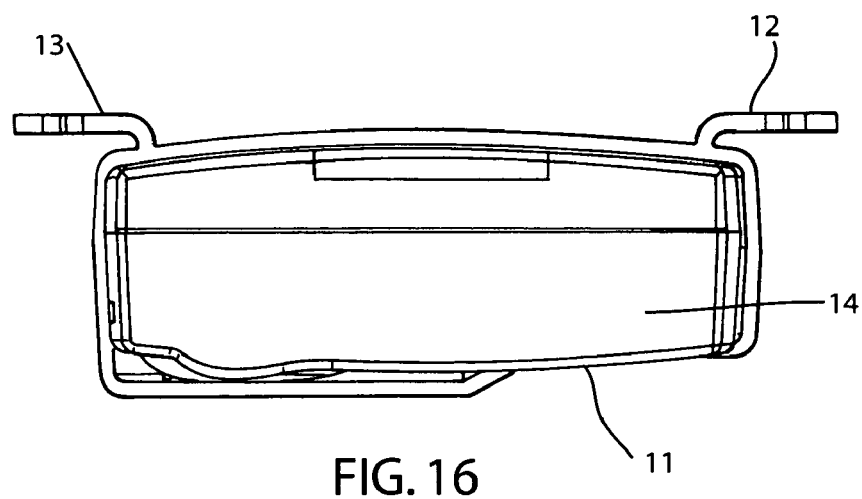

FIG. 12 shows an added input screen for entering alcohol history of driver into program as well as limiting speed at certain hours of the day. FIG. 13 is the SAVE screen for entering the data of FIGS. 11 and 12.

Figure 14:
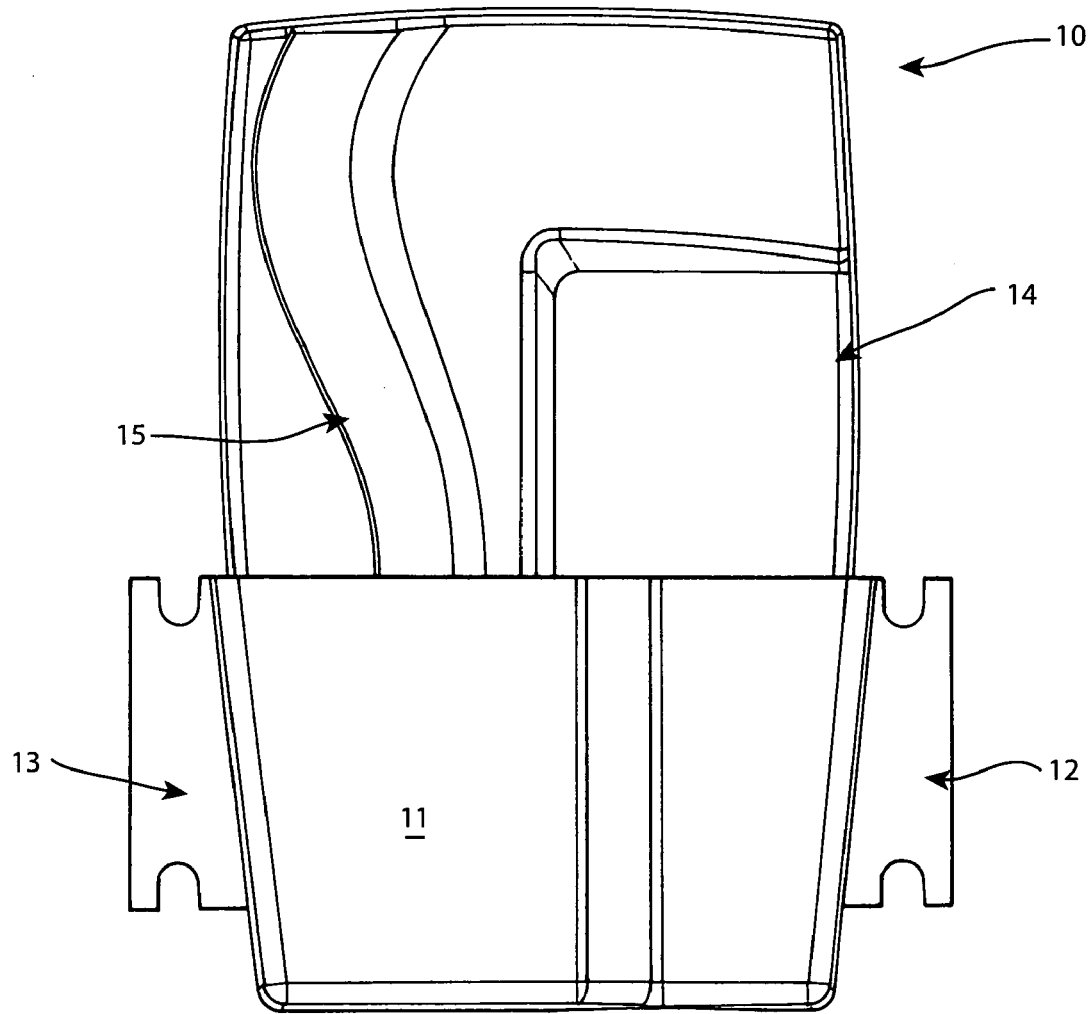
Figure 17:
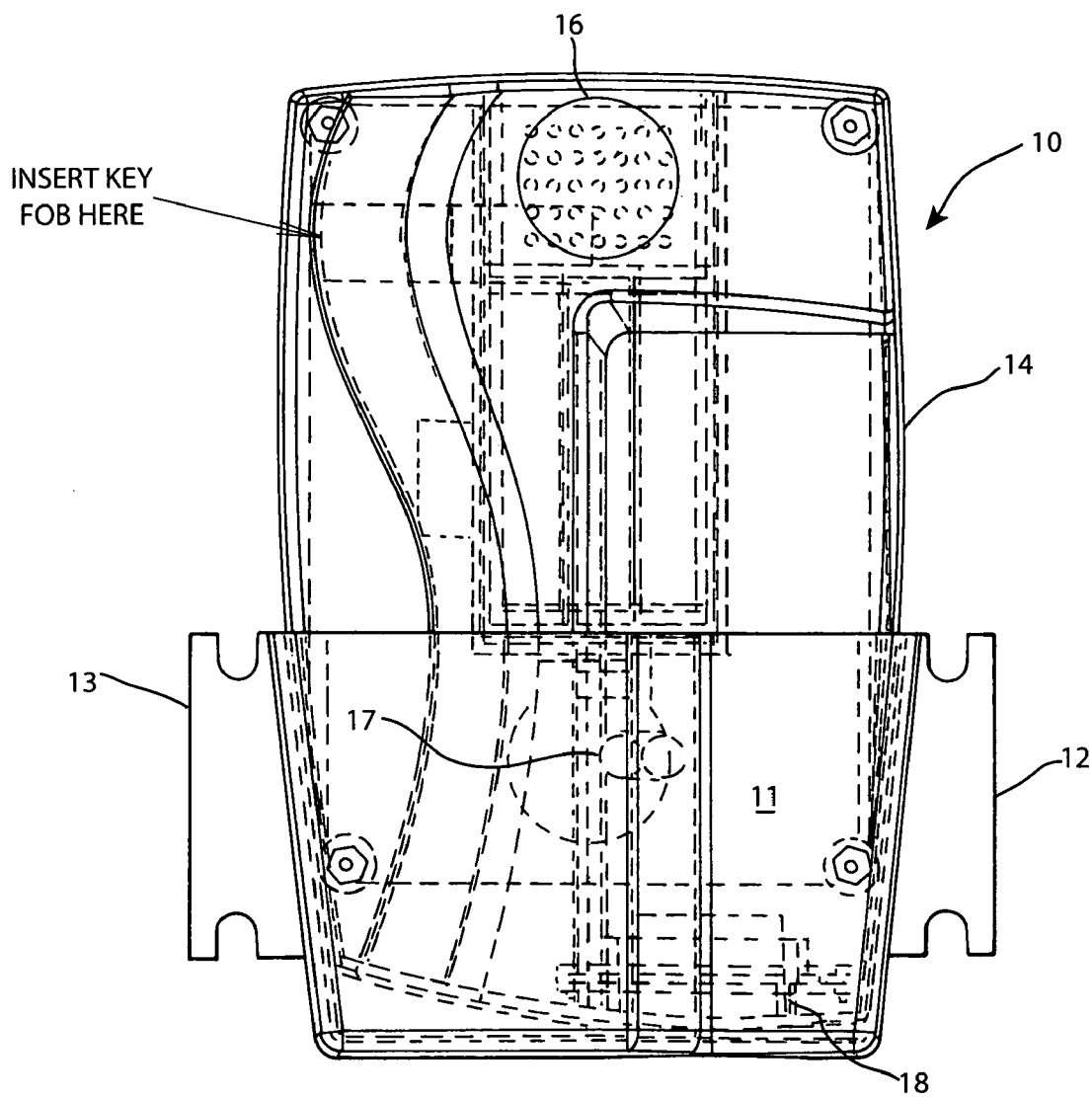

FIG. 14 shows the basic module of this invention which is secured near the steering wheel within the car and it generally denoted as 10. It consists of a permanently mounted lower portion 11 with securing flanges 12 and 13 and a removable portion 14 which contains certain programmable components. A design 15 is on the front cover of the removable portion. A microprocessor (not shown) is placed inside the unit 10 and the wiring therefore is located within the removable portion 14 as shown in FIG. 17 which shows the wiring and internal shape of the unit. Holes 16 are located in the front cover and serve to allow the sound from a 70 dB alarm to escape from the unit to warn the driver of programmed limitations or his or her exceeding them. Also located in the base unit is the connection 18 to the electrical system of the automobile.

Figure 18:
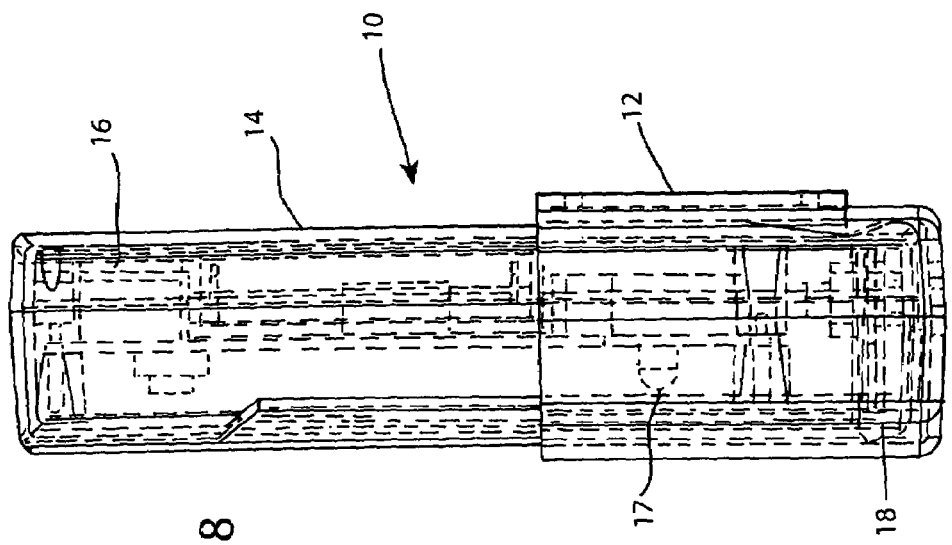
FIG. 18 is a side view of FIG. 17.
Figure 15:
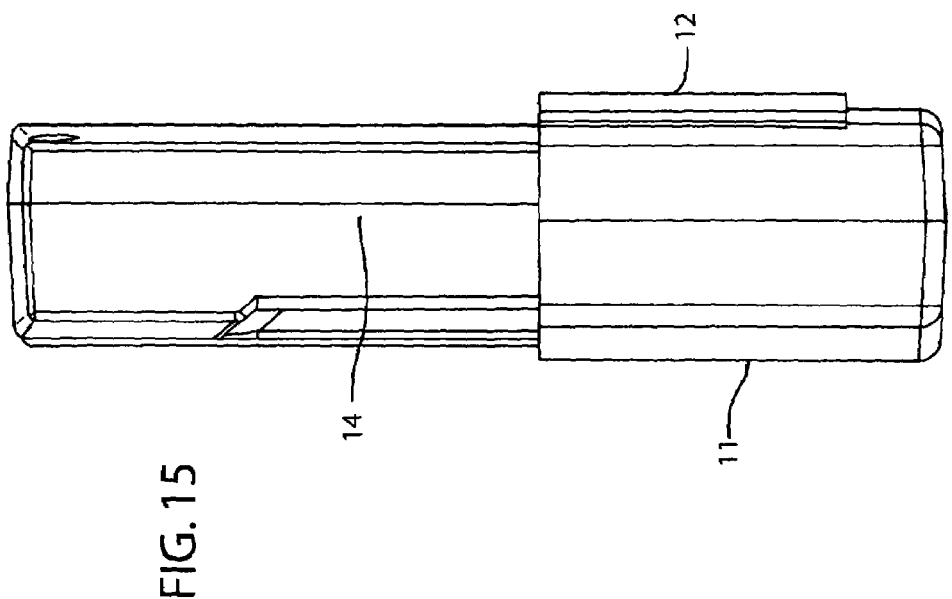
Figure 19:
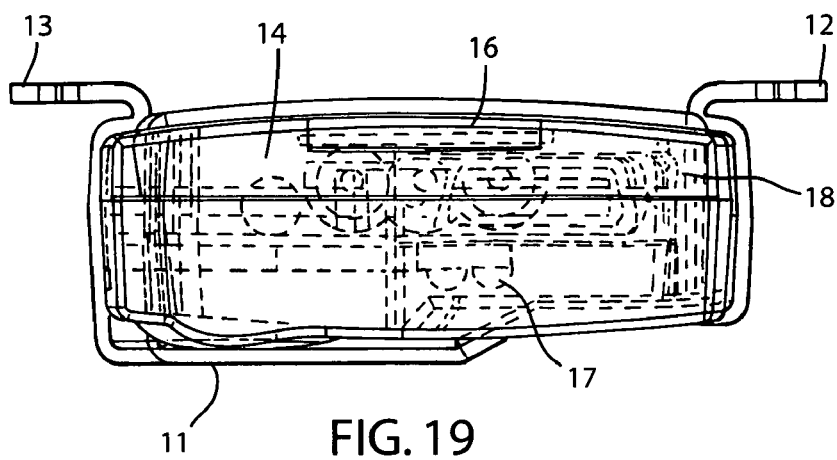
FIG. 19 is a top view of FIG. 17.
Figures 20, 20A:
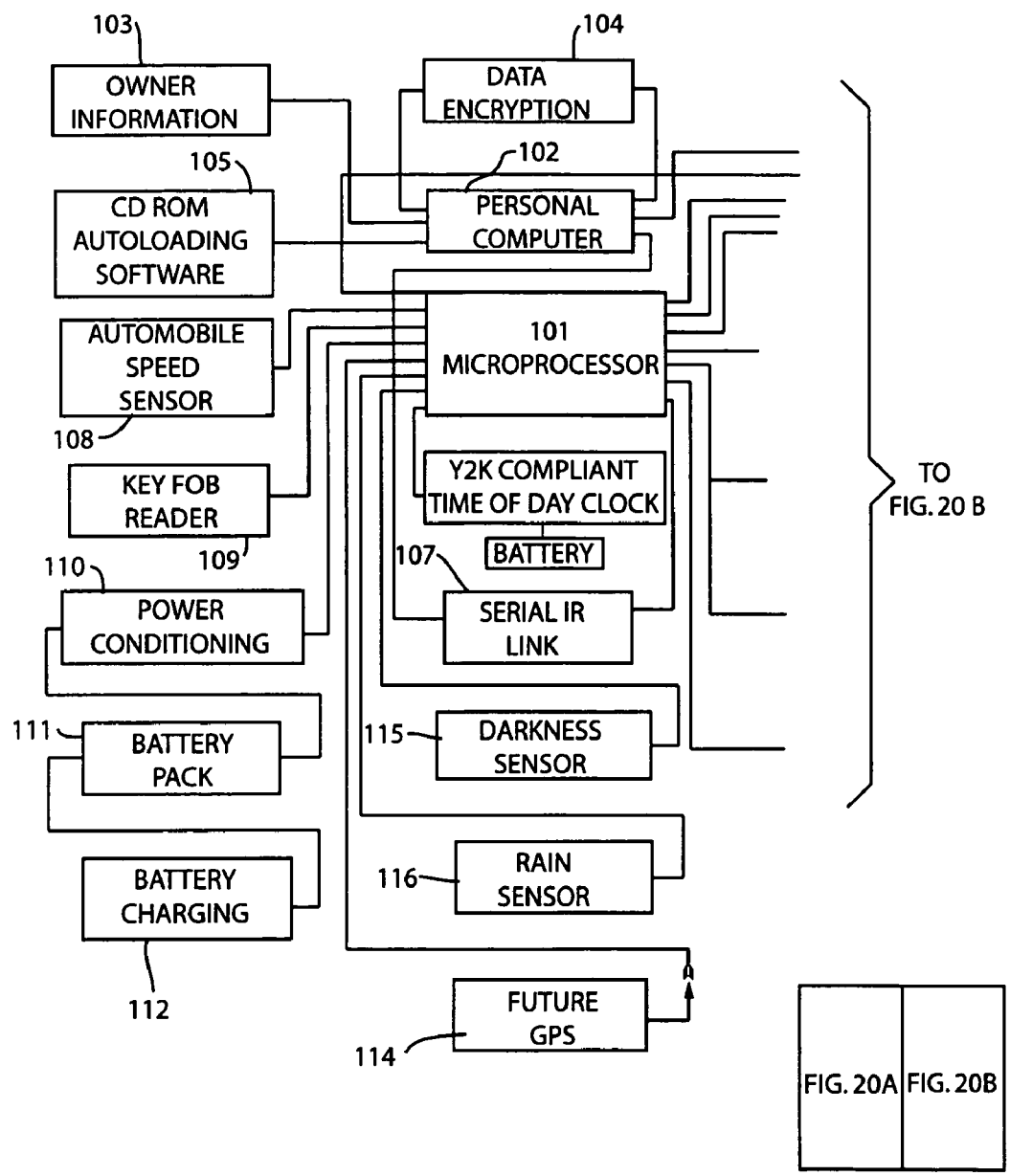
FIG. 20 is a functional diagram of the operating system of this invention showing the various components in a diagrammatic view.
Figure 20B:
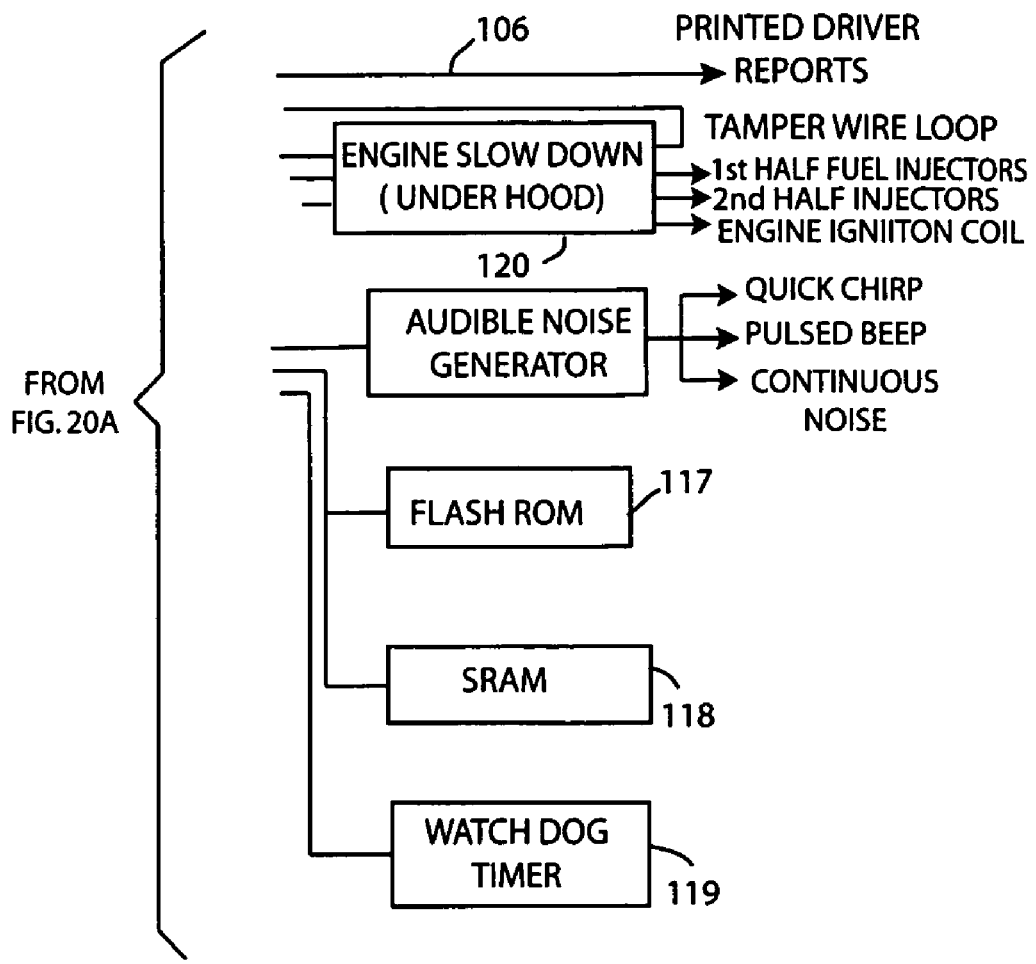
Figure 21B:
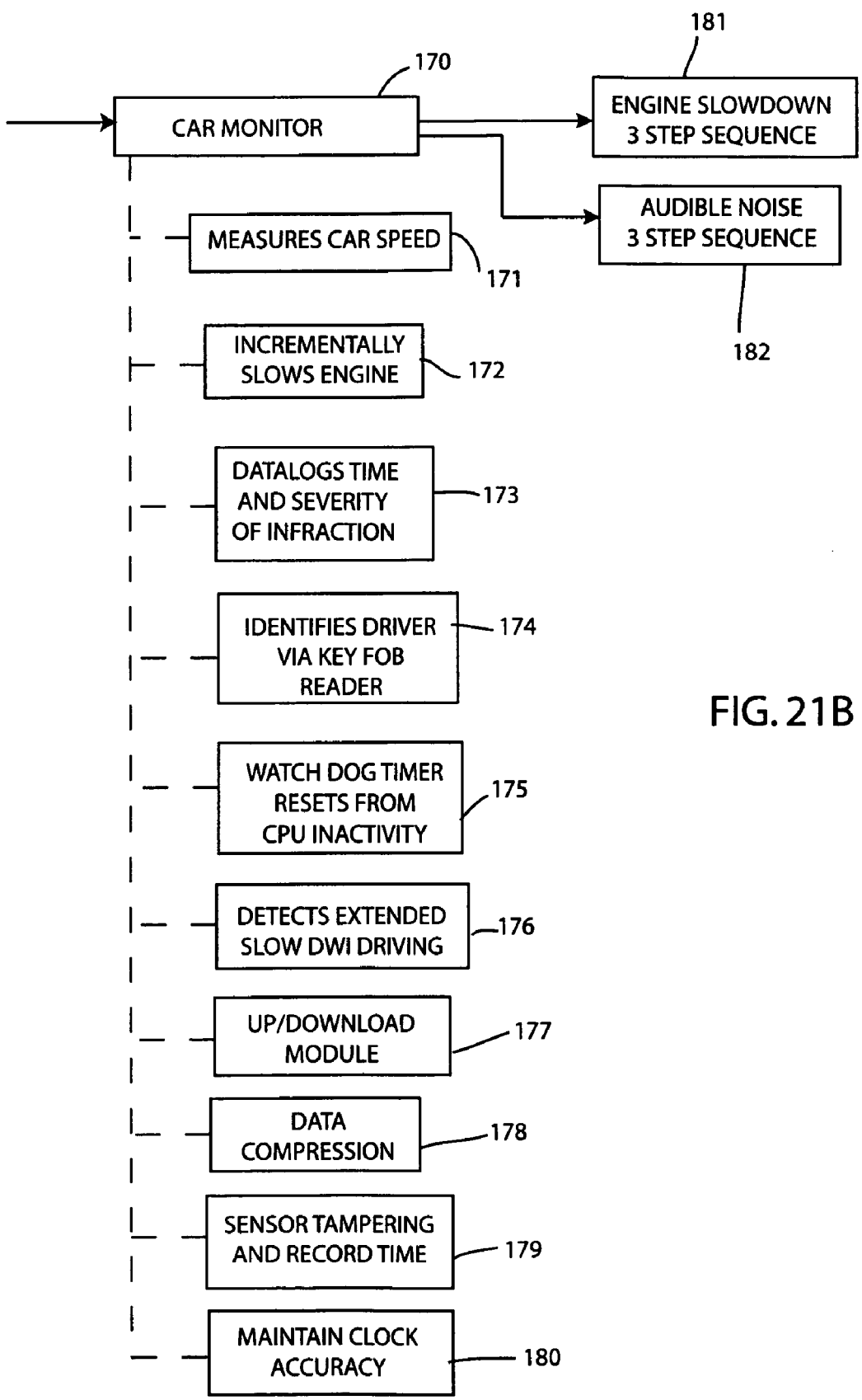
FIG. 21 is a functional diagram of the system of the instant invention showing the user input, personal computer, car monitor and warning and slowdown function relationship.

Depending on the preprogrammed instructions the connection can transmit instructions to slowly shut down the injector banks, about half at a time. It also carries the signals that senses rain and darkness, any attempt at tampering and the information from reading the shaft speed with a pulse train. FIGS. 18 and 19 show the side and top views respectively of the unit with the holes 16 and connection 18. FIG. 15 shows the side view of the unit of FIG. 14 and the unit is mounted, by bolts, U-bolts or other suitable fastening means near the steering wheel of the vehicle it is being placed in. Referring now to FIGS. 20 and 21 there is shown the overall diagrammatic view of the functional circuit that operates the system.

FIG. 20 shows the overall component diagrammatic layout of the system. The system is designated overall as 100. It utilizes a central microprocessor 101 which can be one of the E86 Micro controllers from AMD. Essentially it would be an AM 186 EM high performance unit with enhanced peripherals with a highly integrated design, integrated PC/AT compatibility, Enhanced Am 386 CPU Core and built-in power management.

A personal computer 102 is used to input information into the unit. Owner information 103 is placed into the unit along with information on CD ROM auto loading software 105. A data encryption function 104 is used and output from the PC 102 can be downloaded into personal driver reports at 106. The PC 102 is connected to the microprocessor 101 by serial infrared link 107.

Connected to the microprocessor 101 are automobile speed sensor 108 which senses the actual speed of the automobile when in use. Also connected to 101 is a key fob reader which checks the identity of the user of the automobile to insure the instant user's data table is used. Components 110, 111 and 112 are the power conditioning unit, the battery pack and a battery charger. These components can be used to charge up the unit.

A clock unit 113 is also connected to the microprocessor and provision is also made for a GPS unit 114 for instant location information on the position of the vehicle on a predetermined grid.

Darkness sensor 115 and Rain sensor 116 are also connected to the microprocessor to supply data on the amount of light and whether the conditions are wet.

Also connected to the microprocessor are Flash Memory 117, SRAM 118 and a watch dog timer 119. The functions of these components have been described.

To facilitate needed action based on the actual sensor data and the preprogrammed driving program and engine slow down module 120 is provided which can initially cut out one half of the engine fuel injectors, the remaining half of the injectors and totally cut off the ignition coil to slow and/or stop the vehicle.

An audible noise generator 121 is also connected to the microprocessor for provision of various warning noises such as a quick chirp, a pulsed beep and a continuous noise. These provide warnings of increasing severity to the driver of the vehicle.

FIG. 21 shows the diagrammatic view of the functions of the drivers input, personal computer and car monitor. As shown the driver inputs 150 include the drivers ID 151, the set speed reduction for rainy conditions 152, the set speed reduction for darkness 153, the initial speed limit setting 154 as a result of the question and answer session and a verification means 155 to verify the PC time of day.

The personal computer 160 is used to enter Format Data 161, to provide a man-machine interface 162, to show the daily driving record 163 in game style presentation, to provide data 164 for subsequent speeds set via computer preselections and to provide function 165 upload/download the module.

The car monitor 170 includes the functions of measuring the car speed 171, incrementally slowing the car engine 172, providing data logs of time and severity of infraction 173, identifying driver via the key fob reader 174, provision of a watch dog timer reset 175 from CPU inactivity, to detect extended slow DUI driving 176, to upload and download the module 177, to provide data compression 178, to sense tampering and record times 179 and to maintain clock assembly 180.

The output of the system provides an engine slowdown 181 in a three step sequence and corresponding audible noise alarms 182.

Having described the preferred embodiment of the invention, it will be obvious to those of ordinary skill in the art to design other versions of this invention which are fully contemplated by the scope of the appended claims.

What is claimed is:

1. A system for specifically regulating the driving performance of a given individual by use of a personal computer, said system comprising
 a monitoring means adapted to be attached to the vehicle the given individual is to drive,
 a data processing means having performance criteria preprogrammed therein and which relates to the driving performance history of said given individual,
 alarm means associated with said data processing means to sound an alarm at selected driving conditions for said given individual, and
 engine control means associated with said data processing means and adapted to regulate operation of the engine of a vehicle,
 whereby the operation of a vehicle by said given individual can be preprogrammed, recorded and closely monitored.

2. A system as in claim 1 wherein said date processing means performance criteria includes a settable speed reduction for rainy conditions.

3. A system as in claim 1 wherein said data processing means performance criteria includes a maximum speed based on historical information on said given individual including his legal driving record.

4. A system as in claim 1 wherein said data processing means performance criteria includes a settable speed reduction for darkness.

5. A system as in claim 1 wherein said monitoring means is comprised of two sections, one section containing a micro controller with an infrared link and/or radio to link for a direct linkage with a PC and the other section being adapted to be permanently attached to the interior of a vehicle, said first section being removable from said vehicle and said second section.

6. A system as in claim 1 wherein said monitoring means includes an antilock type sensor and said data processing means includes a clock.

7. A system as in claim 1 wherein said monitoring means includes means to monitor the speed of said vehicle by counting clock cycles as an assessment of part of a square wave coming from an antilock type sensor which measures the rising edge of the square wave.

8. A system for monitoring and controlling the operation of a motor vehicle, said system including;
 an electronic module means adapted to be mounted in the interior of a vehicle to be controlled and monitored,
 sensor means connected to said module means and adapted to senses the speed of said vehicle,
 data-link means on said electronic module by which control program data specific to a driver may be downloaded into said module to create driving parameters for multiple drivers per vehicle,
 whereby the operation of said vehicle may be limited to preprogrammed parameters in terms of speed and other factors including the operators driving history.

9. A system as in claim 8 wherein said sensor means is also adapted to sense the presence of rainy conditions and said control program data is responsive to said rainy conditions being sensed by further limiting the parameters of the operation of said vehicle by said driver.

10. A system as in claim 8 wherein said sensor means is also adapted to sense darkness and said control program data is responsive to said data darkness being sensed by further limiting the parameters of the operation of said vehicle by said driver.

11. A system as in claim 8 including antilock type sensors and wherein said speed sensor means counts clock cycles at a point of the square wave coming from the antilock sensor on one of the vehicle wheels to give a digital detection of speed and loads a register integral with wheel speed sensor.

12. A system as in claim 8 wherein said electronic module means and said speed sensor means are programmed so that previously loaded vehicle operational limiting data is not downloaded into the PC based data screen until said driver has exceeded preprogrammed vehicle operation parameters.

13. A system as in claim 12 wherein said system additionally includes means to initially slow down said vehicle's operation by disabling a portion of its motor function when said initial vehicle operating parameters are exceeded by the driver.

14. A system as in claim 13 wherein said means to slow down said vehicle operation also is capable of stopping said vehicle if other preprogrammed parameters, including one to detect a drunken driver, is recognized by the sensors.

15. A system as in claim 13 wherein said system additionally includes means to provide an alarm prior to slowing down said vehicle by disabling a portion of it's motor.

16. A system as in claim 15 wherein said means to provide an alarm has several levels, the first being to warn the driver with a quick sound or chirp before a date stamp is recorded, the second being adapted to warn of an impending shut off of a portion of the motor's fuel injectors, and at least one other adapted to warn the driver of a total shut off of the motor and/or ignition.

17. A system as in claim 13 wherein said means to slow down the motor operation includes means to turn off a fraction of the fuel injectors on the motor.

18. A system as in claim 8 wherein said electronic module means contains a serial micro controller, a programmable input and a timer, the module controls it's own memory function.

19. A system as in claim 8 wherein said system also includes means to detect system tampering by anyone, including the driver, other than authorized personal as well as recording the time of the tampering.

20. A system as in claim 19 wherein said tampering detection system includes a key fob function.

21. A system as in claim 8 wherein said system also includes a battery pack and an accompanying charger.

22. A system as in claim 8 and including means to record the operation of the vehicle for each specific driver in terms of speed and compliance with preprogrammed parameters in FLASH memory so that destruction or battery loss will not compromise the data recorded.

23. A system as in claim 8 wherein said system also includes means to identify the correct driver for the vehicle for a given time period.

24. The method of controlling the operation of a motor vehicle by the use of a preprogrammed module mounted in said vehicle and connected to the control circuit and motor of said vehicle, said method comprising
preprogramming said module with information relating to one or more of the following data groups,
judicial information on the designated driver, to include age, license type, and entire violation record and court history
parental information on the designated driver, to include parental inputs as to curfew times, maximum speeds at various times of the day and night,
commercial information on the designated driver, to include type of license, experience with the particular vehicle type, past training on the vehicle and total number of hours spent on vehicle type,
statistical information on the designated driver, to include age, gender, and length of driving time,
providing an identification function to enable the designated driver to start and operate said motor vehicle,
downloading the operation of said motor vehicle by said designated driver at the conclusion of said operation, and
making any changes to said preprogramming necessitated by the previous driving record,
whereby a designated driver's continued operation of a motor vehicle may be monitored over time and corrective operation parameters programmed in where needed.

25. The method of claim 24 wherein said preprogrammed data is programmed into said module via an infra-red or radio data link.

26. A module as in claim 25 and including an infra red data link means for uploading and downloading said module.

27. An electronic module for use in controlling the operation of a vehicle by a specific driver, said module comprising
a first portion adapted to be mounted inside a motor vehicle,
a second portion adapted to be placed inside said first portion,
a micro controller operational and sensing circuit means within said second portion and adapted to be loaded with operational parameters for operation of said motor vehicle,
whereby said second portion may be removed from said vehicle and first portion to be programmed by a conventional PC.

28. A module as in claim 27 and including an alarm means adapted to warn the driver of an imminent alteration of the vehicles motor performance.

29. An interactive program for monitoring a youngsters driving performance for a vehicle containing a monitor for monitoring driver performance, said program comprising
means to present to the parent of a youngster a record of his or her driving record for a given day,
selection means within the software which is adapted to interact with a control device on a vehicle to allow or not allow the youngster to drive the day following the given day,
whereby the youngster can control his ability to drive by driving properly and will be denied the ability to drive when his or her driving is below standards.

30. A program as in claim 29 wherein said program includes interactive testing to determine whether the youngster may drive the following day or at any time subsequent to the given day.

31. A program as in claim 30 wherein said interactive testing includes movie clips.

32. A program as in claim 30 and including means to alter the driving program of the previous day which will be automatically transmitted to the vehicle monitor.

* * * * *